(12) United States Patent
Shamkhi

(10) Patent No.: US 11,384,885 B2
(45) Date of Patent: Jul. 12, 2022

(54) FLEXIBLE DOUBLE WALLED HOSE CONNECTION

(71) Applicant: The Boeing Company, Chicago, IL (US)

(72) Inventor: Munir D. Shamkhi, Renton, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 17/006,081

(22) Filed: Aug. 28, 2020

(65) Prior Publication Data

US 2020/0393072 A1   Dec. 17, 2020

Related U.S. Application Data

(62) Division of application No. 15/946,502, filed on Apr. 5, 2018, now Pat. No. 10,794,522.

(51) Int. Cl.
  F16L 39/00    (2006.01)
  F16L 39/02    (2006.01)

(52) U.S. Cl.
  CPC .......... *F16L 39/005* (2013.01); *F16L 39/02* (2013.01)

(58) Field of Classification Search
  CPC ......... F16L 39/00; F16L 39/005; F16L 39/02; F16L 37/56; F16L 37/565; F16L 2201/30
  USPC .................... 285/123.15, 123.16, 123.17
  See application file for complete search history.

(56) References Cited

U.S. PATENT DOCUMENTS

| | | |
|---|---|---|
| 2,838,074 A | 6/1958 | Lauck |
| 2,956,586 A | 10/1960 | Zeigler et al. |
| 4,293,150 A | 10/1981 | Press |
| 5,285,744 A | 2/1994 | Grantham et al. |
| 5,884,945 A | 3/1999 | Bader et al. |
| 6,446,661 B2 | 9/2002 | Armenia et al. |
| 6,682,102 B1 | 1/2004 | Betz |
| 7,427,084 B1 | 9/2008 | Betz |
| 7,458,543 B2 | 12/2008 | Cutler et al. |
| 8,308,200 B1 | 11/2012 | Barnes et al. |
| 8,820,794 B1 | 9/2014 | Betz et al. |
| 9,964,222 B1 | 5/2018 | Jones et al. |
| 10,794,522 B2 | 10/2020 | Shamkhi |
| 2003/0094207 A1 | 5/2003 | Qutub et al. |
| 2004/0207197 A1 | 10/2004 | Hoang et al. |
| 2007/0074759 A1 | 4/2007 | Mcclung, Jr. et al. |
| 2009/0091126 A1 | 4/2009 | Carns et al. |
| 2009/0145506 A1* | 6/2009 | Queau ............... F16L 39/02 138/112 |
| 2009/0256352 A1 | 10/2009 | Petit et al. |
| 2013/0153046 A1 | 6/2013 | Hansom et al. |
| 2014/0261839 A1 | 9/2014 | Pelletier et al. |
| 2015/0130183 A1 | 5/2015 | Statler et al. |
| 2016/0223102 A1 | 8/2016 | Gjerde |
| 2017/0016563 A1 | 1/2017 | Hunt et al. |

(Continued)

*Primary Examiner* — Aaron M Dunwoody
(74) *Attorney, Agent, or Firm* — Kwan & Olynick LLP

(57) ABSTRACT

A flexible conduit for transporting fluids in a fluid system, such a fluid system on an aircraft, and methods of assembling the flexible conduit described. The flexible conduit can include a flexible inner hose for transporting a fluid. The flexible inner hose can be surrounded by a flexible outer wall which can contain any leakage of fluid from the flexible inner hose. The flexible inner hose and the flexible outer wall can be coupled on each end to ferrules. Swage rings can be swaged to secure the flexible inner hose and the flexible outer wall to the ferrules.

20 Claims, 12 Drawing Sheets

(56) References Cited

U.S. PATENT DOCUMENTS

| | | | |
|---|---|---|---|
| 2017/0082224 A1 | 3/2017 | Larsson et al. | |
| 2017/0370513 A1 | 12/2017 | Waugh et al. | |
| 2018/0106398 A1 | 4/2018 | Ruprecht et al. | |
| 2018/0135781 A1 | 5/2018 | Ravarini | |

\* cited by examiner

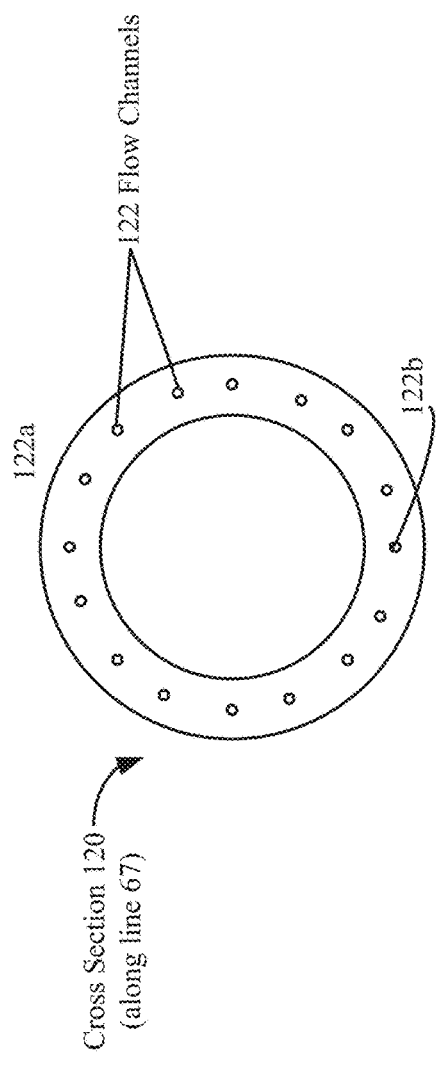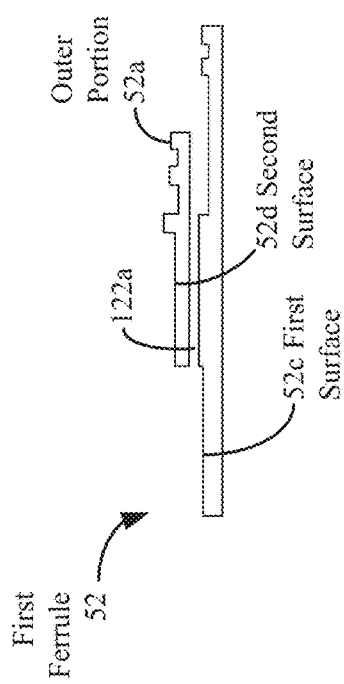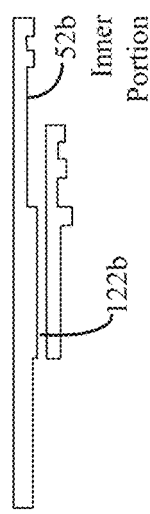

```
Slide the third outer swage ring, the fourth outer swage ring and
the second flexible outer hose to the right to generate space to
swage the second inner swage ring                              224

Position the second inner swage ring over the second end of the flexible inner
hose and apply swaging to second inner swage ring              226

Slide the second end of the second flexible outer hose over the second surface
on the outer portion of second ferrule                         228

Position the third outer swage ring over the first end of second flexible outer
hose and apply swaging to third outer swage ring               230

Position the fourth outer swage ring over the second end of the second flexible
outer hose and apply swaging to the fourth outer swage ring    232
```

*FIG. 5B*

FLEXIBLE DOUBLE WALLED HOSE CONNECTION

CROSS-REFERENCE TO RELATED APPLICATIONS

This application is a divisional of U.S. patent application Ser. No. 15/946,502, entitled: "Flexible Double Walled Hose Connection", filed on 2018 Apr. 5, which is incorporated herein by reference in its entirety for all purposes.

TECHNICAL FIELD

This disclosure generally relates to a flexible fluid conduit. More specifically, this disclosure relates to a flexible double walled hose connection which utilizes inner and outer swaging.

BACKGROUND

Aircraft include fluid systems for transporting fluids throughout the vehicle. Many of the fluids, such as fuel, are hazardous. Thus, the fluid systems need to be very reliable.

In many portions of the aircraft, rigid conduits can be utilized in the fluid system. However, in some areas of the vehicle, for load dissipation and to simplify the installation process, more flexible conduits are desirable. In view of the above, flexible conduits, which can be used in aircraft and other fluid transport applications, are described.

SUMMARY

One aspect of the disclosure can be related to a fluid system. The fluid system can include a plurality of conduits configured to transport a fluid. In one embodiment, the fluid system can be used on an aircraft to transport a fluid, such as fuel. A first conduit in the fluid system can include: 1) a first ferrule having an outer portion and an inner portion, 2) a second ferrule having an outer portion an inner portion, 3) a flexible inner hose and 4) a flexible outer wall.

The flexible inner hose can be configured to receive the fluid. The flexible inner hose can have: 1) a first end disposed between a first surface on the inner portion of the first ferrule and a first inner swage ring where the first inner swage ring is swaged to secure the first end of the flexible inner hose to the first ferrule and 2) a second end disposed between a first surface on the inner portion of the second ferrule and a second inner swage ring where the second inner swage ring is swaged to secure the second end of the flexible inner hose to the second ferrule.

The flexible outer wall can surround the flexible inner hose, the first inner swage ring and the second inner swage ring. The flexible outer wall can provide a barrier if the flexible inner hose leaks. The flexible outer wall can have: 1) a first end disposed between a second surface on the outer portion of the first ferrule and a first outer swage ring where the first outer swage ring is swaged to secure the first end of the flexible outer wall to the first ferrule and 2) a second end disposed between a second surface on the outer portion of the second ferrule and a second outer swage ring where the second outer swage ring is swaged to secure the second end of the flexible outer wall to the second ferrule.

In one embodiment, the outer portion and the inner portion of the first ferrule can be integrally formed. In another embodiment, the outer portion and the inner portion of the first ferrule can be formed as separate pieces. When the outer portion and the inner portion are separately formed, a plurality of fasteners can be used to secure the outer portion to the inner portion.

In a particular embodiment, the flexible outer wall can be formed from a first flexible outer hose, a second flexible outer hose and a support sleeve. A first end of the first flexible outer hose can form the first end of the flexible outer wall, which is swaged to the first ferrule. A second end of the second flexible outer hose can form the second end of the flexible outer wall, which is swaged to the second ferrule.

Further, a second end of the first flexible outer hose can be disposed between a first surface on the support sleeve and a third outer swage ring, The third outer swage ring can be swaged to secure the second end of the first flexible outer hose to the support sleeve. A first end of the second flexible outer hose can be disposed between a second surface on the support sleeve and a fourth outer swage ring. The fourth outer swage ring can be swaged to secure the first end of the second flexible outer hose to the support sleeve.

In yet other embodiments, the fluid system can include one or more fluid reservoirs disposed between the flexible inner hose and the flexible outer wall. The fluid reservoirs can each be configured to receive the fluid when the flexible inner hose leaks. The first ferrule and the second ferrule can each include a plurality of flow channels in fluid communication with the one or more fluid reservoirs. The plurality of flow channels can allow fluid in the one or more fluid reservoirs to flow through the first ferrule and the second ferrule.

In further embodiments, a cross section of the flexible outer wall can be circular. In this instance, a diameter of the flexible outer wall can be between one and ten inches. A length of the first conduit can be between ten and thirty inches. In addition, the first ferrule or the second ferrule can include a flange.

In another embodiment, the fluid system can further include a bonding agent. The bonding agent can be disposed between one or more of 1) the flexible inner hose and the first surface on the inner portion of the first ferrule, 2) the flexible inner hose and the first inner swage ring and 3) combinations thereof. In a particular embodiment, the fluid system can be used on an aircraft.

Another aspect of the disclosure can be related to a ferrule. The ferrule can include an inner portion, an outer portion and a plurality of fluid channels. The inner portion can have a first surface configured to receive a first end of a flexible inner hose and a first inner swage ring. The first inner swage ring can be swaged to couple the first end of the flexible inner hose to the first surface.

The outer portion can have a second surface configured to receive a first end of a flexible outer hose and a first outer swage ring. The flexible outer hose can surround a portion of the flexible inner hose. The first outer swage ring can be swaged to couple the first end of the flexible outer hose to the second surface. The plurality of fluid channels can be configured to allow fluid to travel between the inner portion and the outer portion.

In particular embodiments, the inner portion and the outer portion can be integrally formed. In another embodiment, the inner portion and the outer portion can be separately formed. Thus, a plurality of fasteners can be configured to couple the inner portion to the outer portion. Further, the inner portion can include a flange for coupling the ferrule to a fluid conduit. The plurality of fluid channels can be configured to transport a leakage of the fluid resulting from a break in the flexible inner hose through the ferrule.

Another aspect of the disclosure can be related to a method of assembling a fluid conduit. The method can be generally characterized as 1) inserting a first end of a flexible inner hose over a first surface of an inner portion of a first ferrule; 2) swaging a first inner swage ring to secure the first end of the flexible inner hose to the first surface of the inner portion of the first ferrule where the first end of the flexible inner hose can be disposed between the first inner swage ring and the first surface of the inner portion of the first ferrule; 3) inserting a first end of a flexible outer wall over the flexible inner hose and over a second surface on an outer portion of a first ferrule; 4) swaging a first outer swage ring to secure the first end of the flexible outer wall to the second surface on the outer portion of the first ferrule where the first end of the flexible outer wall can be disposed between the first outer swage ring and the second surface on the outer portion of the first ferrule; 5) inserting a second end of the flexible inner hose over a first surface of an inner portion of a second ferrule; 6) swaging a second inner swage ring to secure the second end of the flexible inner hose to the first surface of the inner portion of the second ferrule where the second end of the flexible inner hose can be disposed between the second inner swage ring and the first surface of the inner portion of the second ferrule; 7) inserting a second end of the flexible outer wall over the flexible inner hose and over a second surface on an outer portion of a second ferrule; and 8) swaging a second outer swage ring to secure the second end of the flexible outer wall to the second surface on the outer portion of the second ferrule where the second end of the flexible outer wall can be disposed between the second outer swage ring and the second surface on the outer portion of the second ferrule.

In particular embodiments, the inner portion of the first ferrule and the outer portion of the first ferrule can be integrally formed. Further, the inner portion of the second ferrule and the outer portion of the second ferrule can be integrally formed. Alternatively, the inner portion of the first ferrule and the outer portion of the first ferrule can be separately formed and fastened together. Also, the inner portion of the second ferrule and the outer portion of the second ferrule can be separately formed and fastened together.

In one embodiment, the flexible outer wall can be formed from a flexible hose. In another embodiment, the flexible outer wall can include a first flexible outer hose, a second flexible outer hose and a support sleeve. The support sleeve can be formed from a rigid material.

In more detail, when a first end of the first flexible outer hose forms the first end of the flexible outer wall, the method can further include swaging a third outer swage ring to secure a second end of the first flexible outer hose to the support sleeve where the second end of the first flexible outer hose can be disposed between the support sleeve and the third outer swage ring. Further, when a second end of the second outer flexible hose forms the second end of the flexible outer wall, the method can further include swaging a fourth outer swage ring to secure a first end of the second flexible outer hose to the support sleeve where the first end of the second flexible outer hose can be disposed between the support sleeve and the fourth outer swage ring.

Another aspect of the disclosure can be related to a method of using a fluid system. The method can be generally characterized as including transporting a fluid through a fluid system having a first conduit. The first conduit can include 1) a first ferrule having an outer portion and an inner portion; 2) a second ferrule having an outer portion and an inner portion, 3) a flexible inner hose and 4) a flexible outer wall.

The flexible inner hose can be configured to receive the fluid and can have: 1) a first end disposed between a first surface on the inner portion of the first ferrule and a first inner swage ring where the first inner swage ring is swaged to secure the first end of the flexible inner hose to the first ferrule and 2) a second end disposed between a first surface on the inner portion of the second ferrule and a second inner swage ring where the second inner swage ring can be swaged to secure the second end of the flexible inner hose to the second ferrule.

The flexible outer wall can surround the flexible inner hose, the first inner swage ring and the second inner swage ring. The flexible outer wall can have 1) a first end disposed between a second surface on the outer portion of the first ferrule and a first outer swage ring where the first outer swage ring can be swaged to secure the first end of the flexible outer wall to the first ferrule and 2) a second end can be disposed between a second surface on the outer portion of the second ferrule and a second outer swage ring where the second outer swage ring can be swaged to secure the second end of the flexible outer wall to the second ferrule.

BRIEF DESCRIPTION OF THE DRAWINGS

Figure 1A:
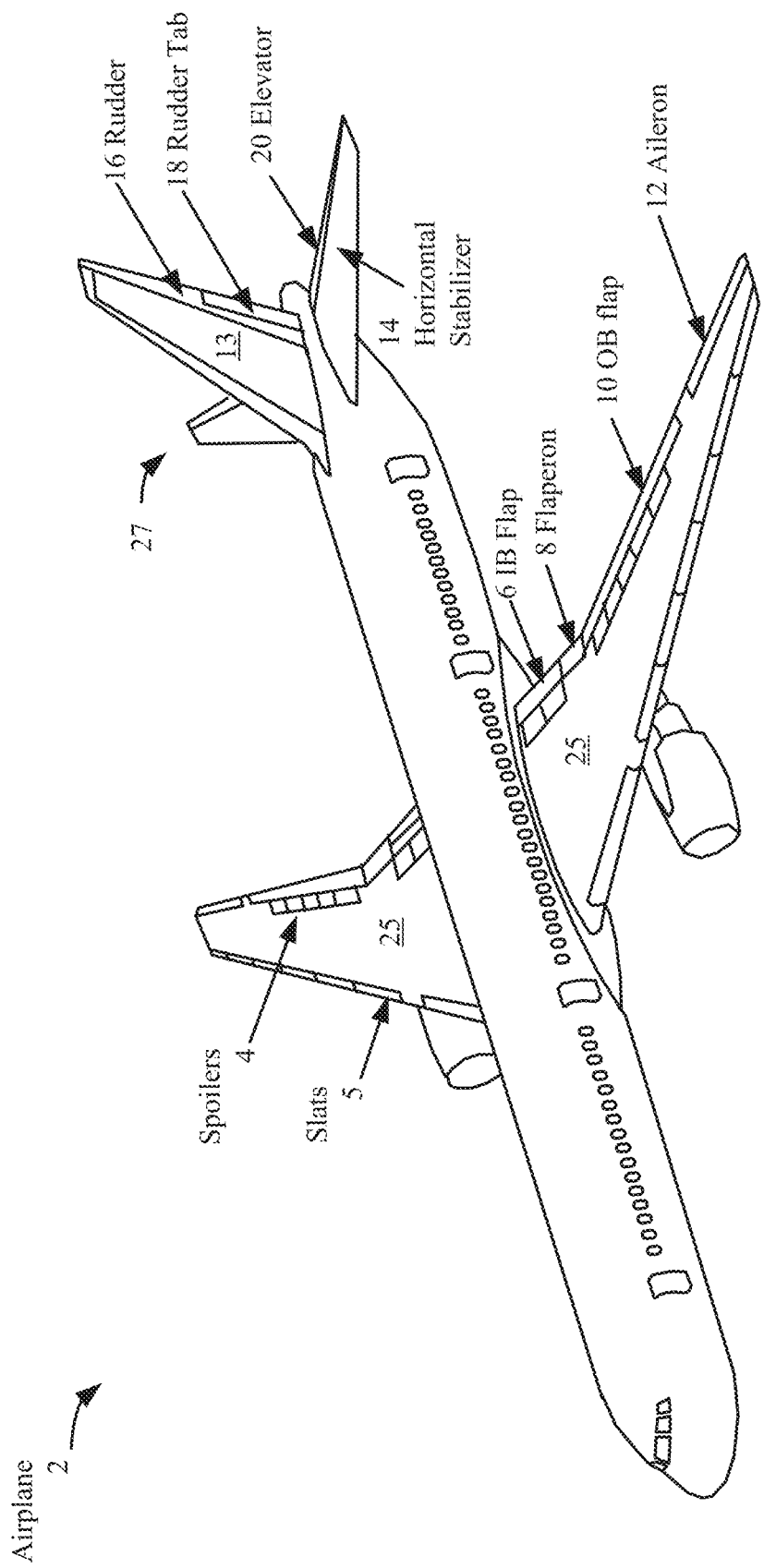

Having thus described examples of the disclosure in general terms, reference will now be made to the accompanying drawings, which are not necessarily drawn to scale, and wherein like reference characters designate the same or similar parts throughout the several views, and wherein:

FIG. 1A is a perspective view illustrating an airplane, according to one aspect of the present disclosure.

Figure 1B:
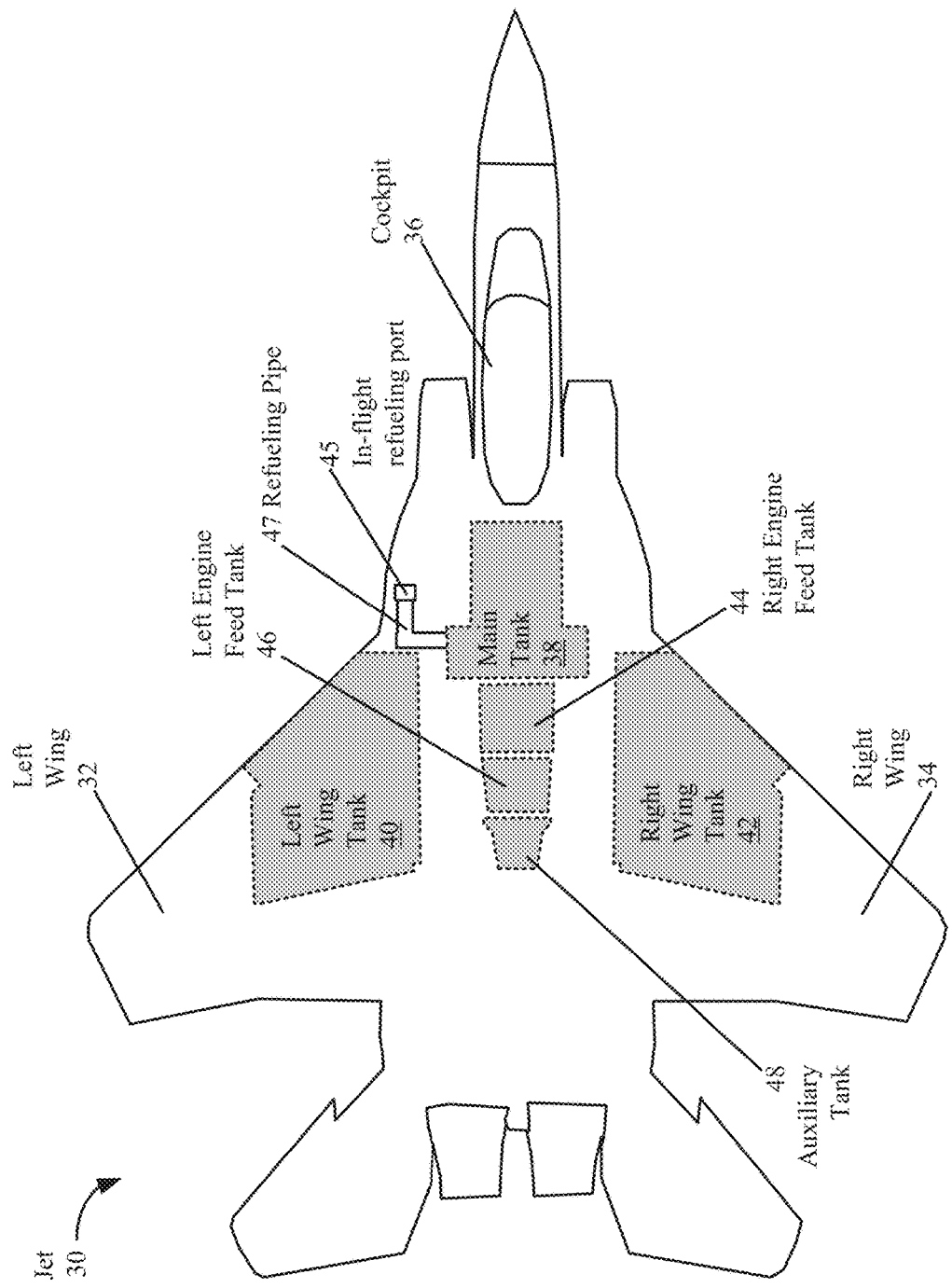

FIG. 1B is a top view illustrating a jet aircraft and fuel tank locations, according to one aspect of the present disclosure.

Figure 2:
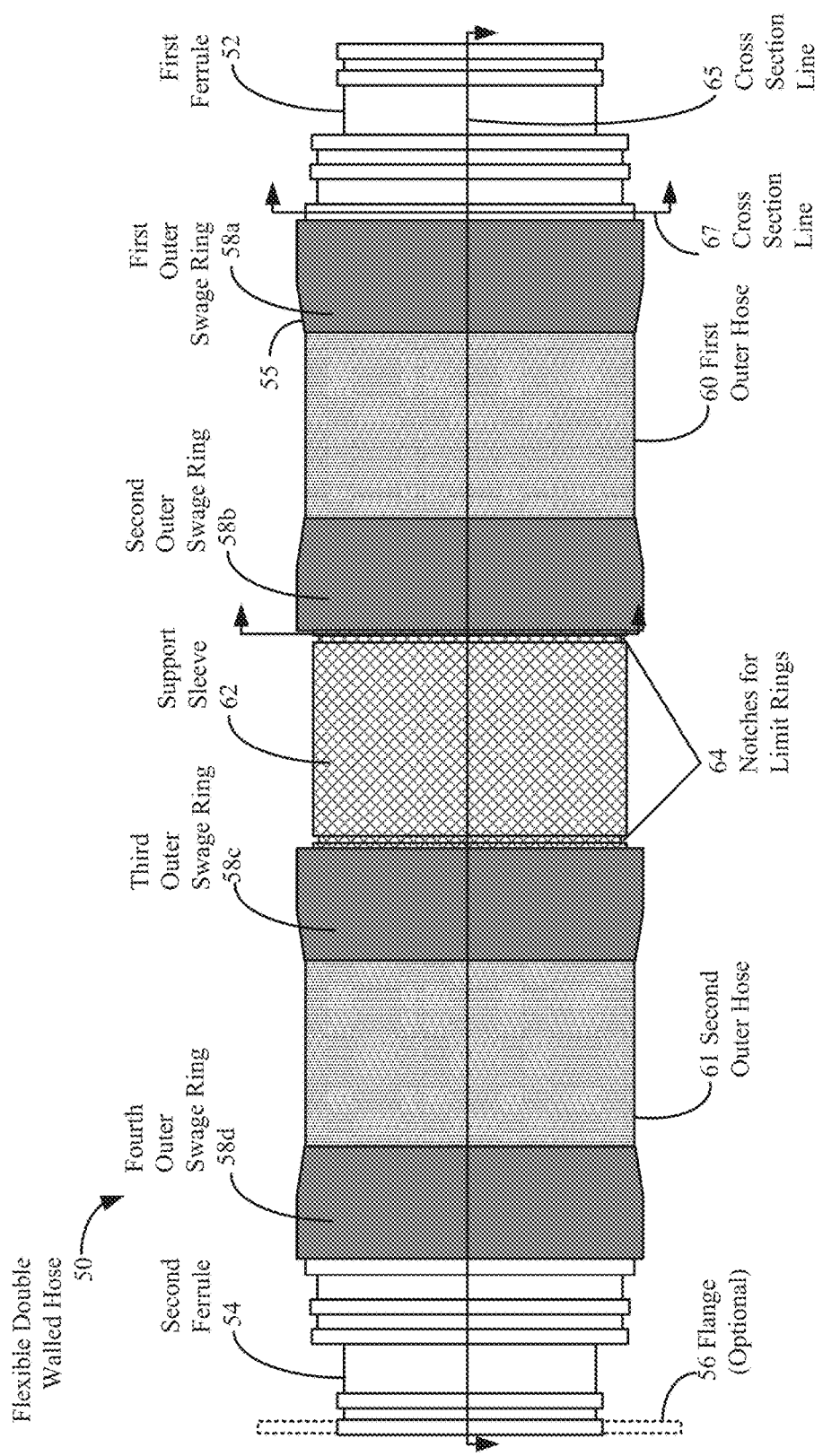

FIG. 2 is a top view of a flexible doubled wall hose connection according to one aspect of the present disclosure.

Figure 3:
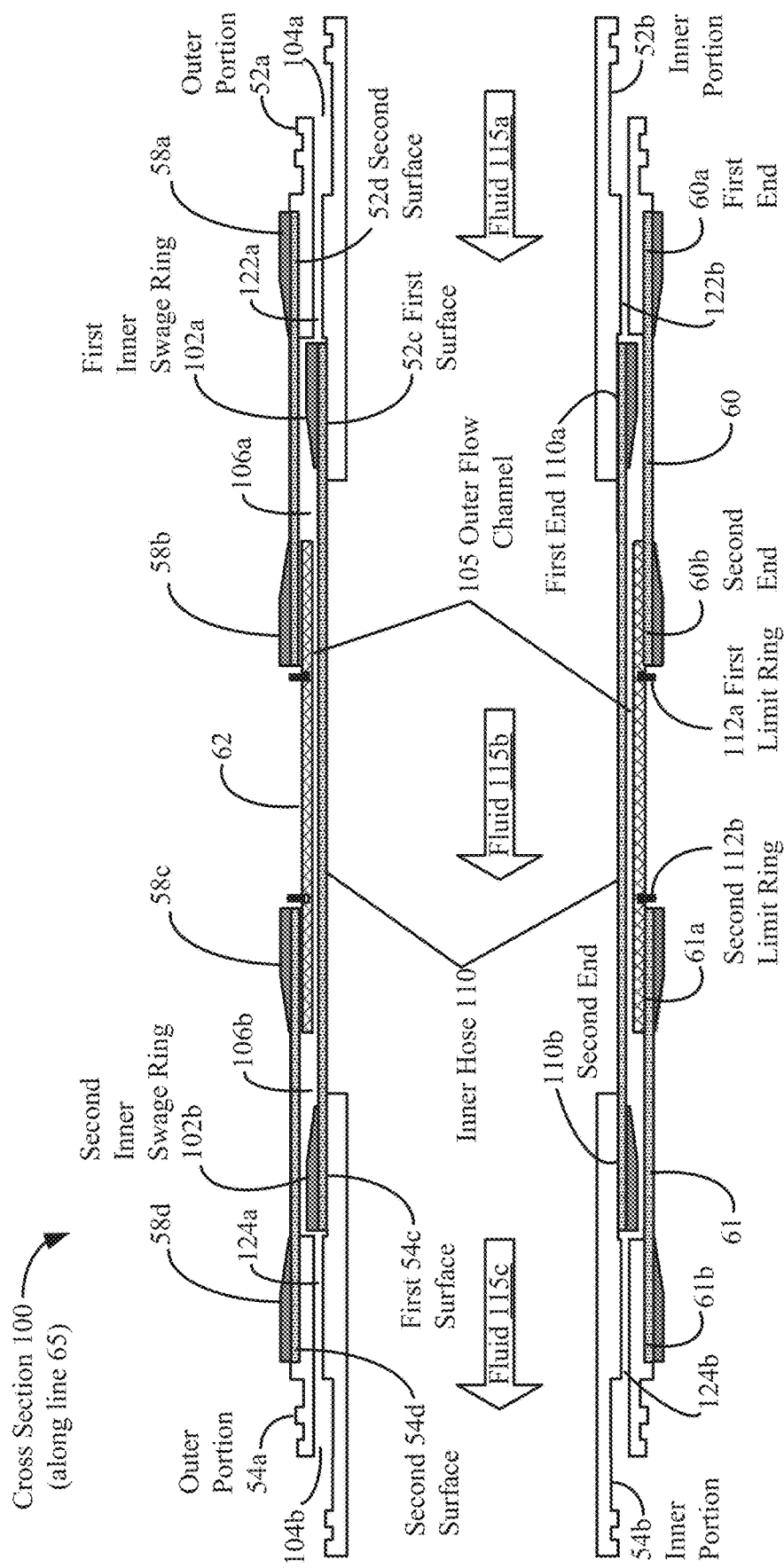

FIG. 3 is a first cross sectional view of the flexible doubled wall hose connection of FIG. 2, according to aspects of the present disclosure.

FIG. 4A is a second cross sectional view of the flexible doubled wall hose connection of FIG. 2, according to one aspect of the present disclosure.

FIG. 4B is a cross sectional view of a ferrule, according to one aspect of the present disclosure.

Figure 5A:
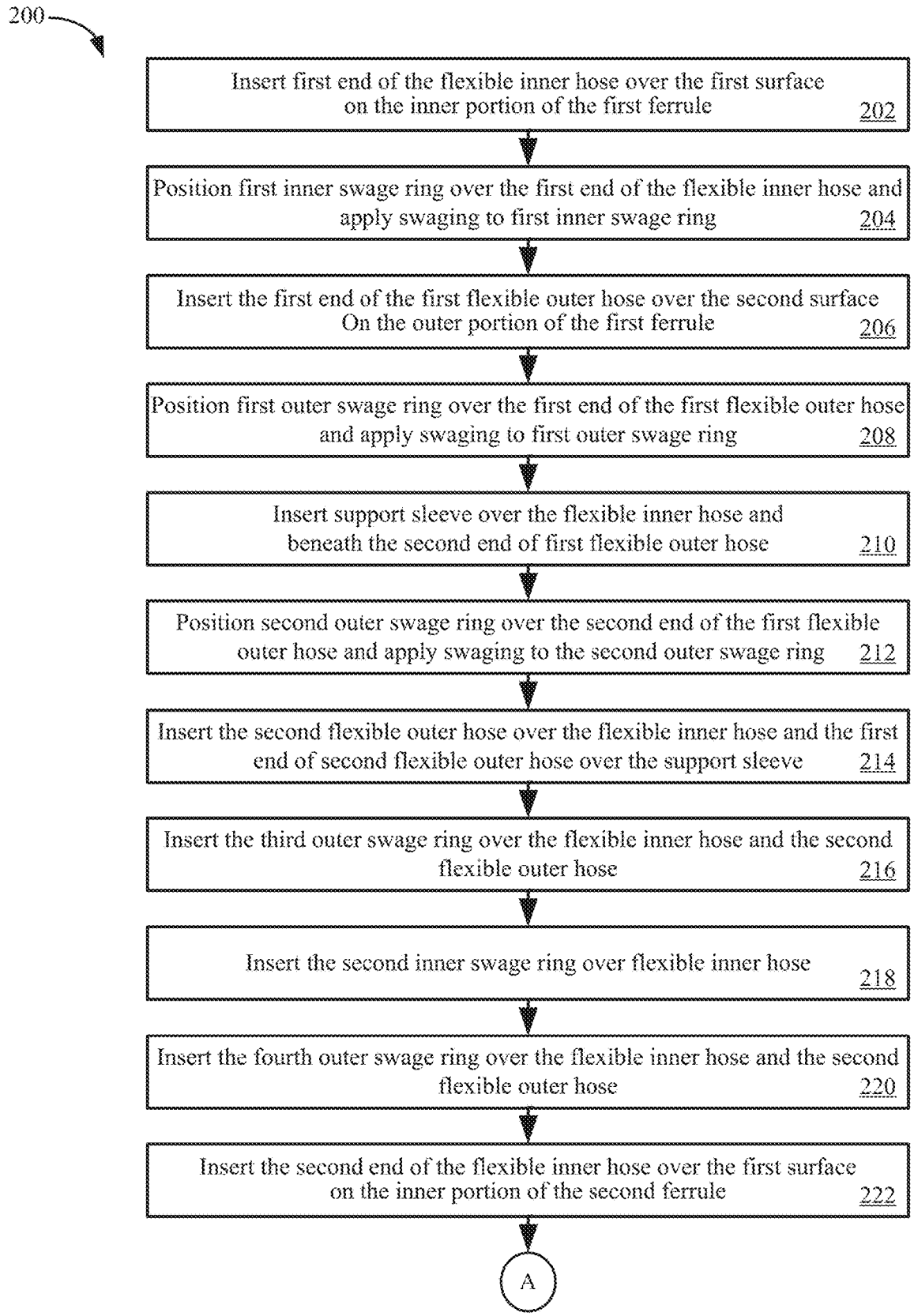

FIGS. 5A and 5B are a block diagram of a method of assembling a doubled wall hose connection of FIG. 2 according to one aspect of the present disclosure.

Figure 6:
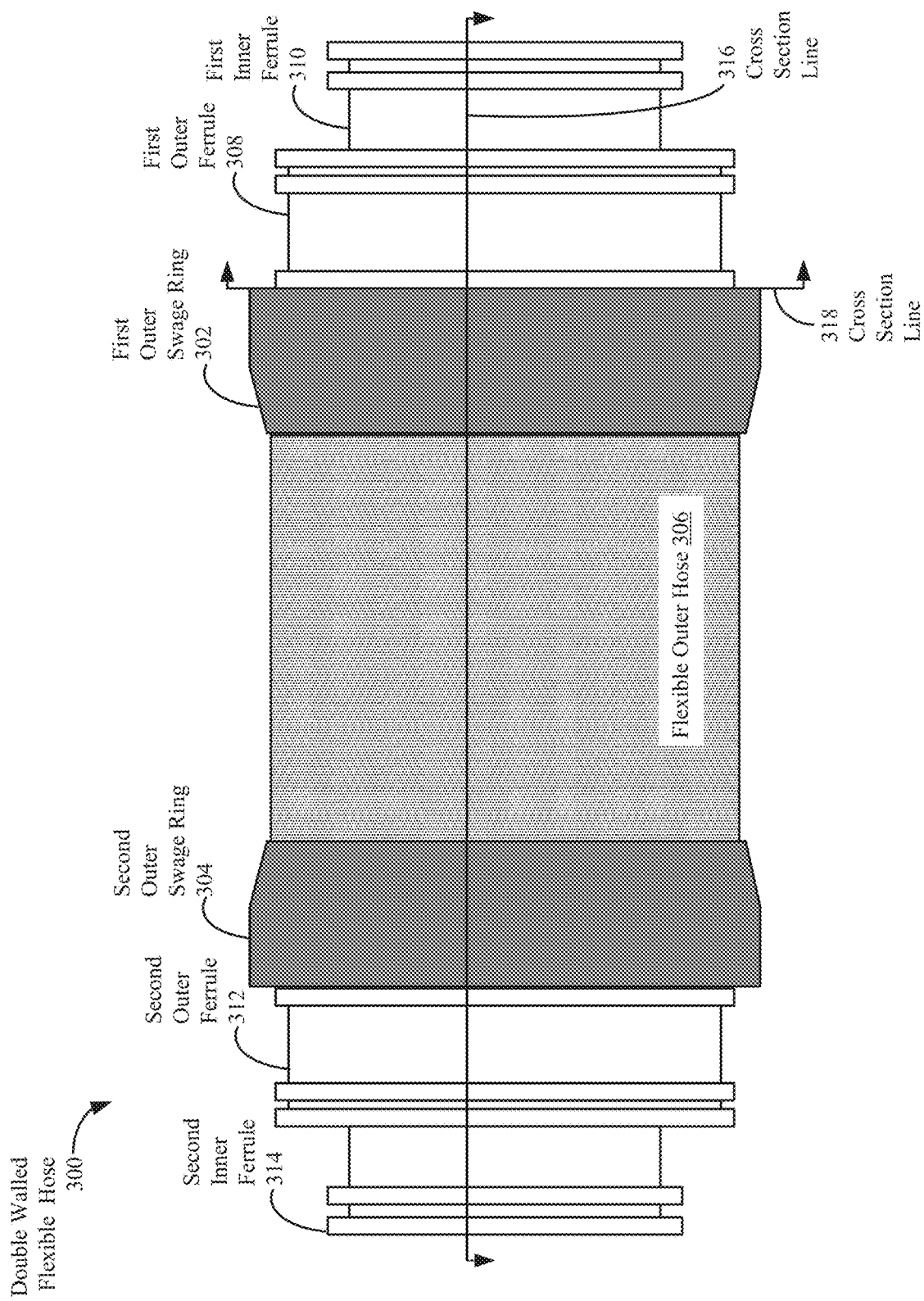

FIG. 6 is a top view of a flexible doubled wall hose connection according to another aspect of the present disclosure.

Figure 7:
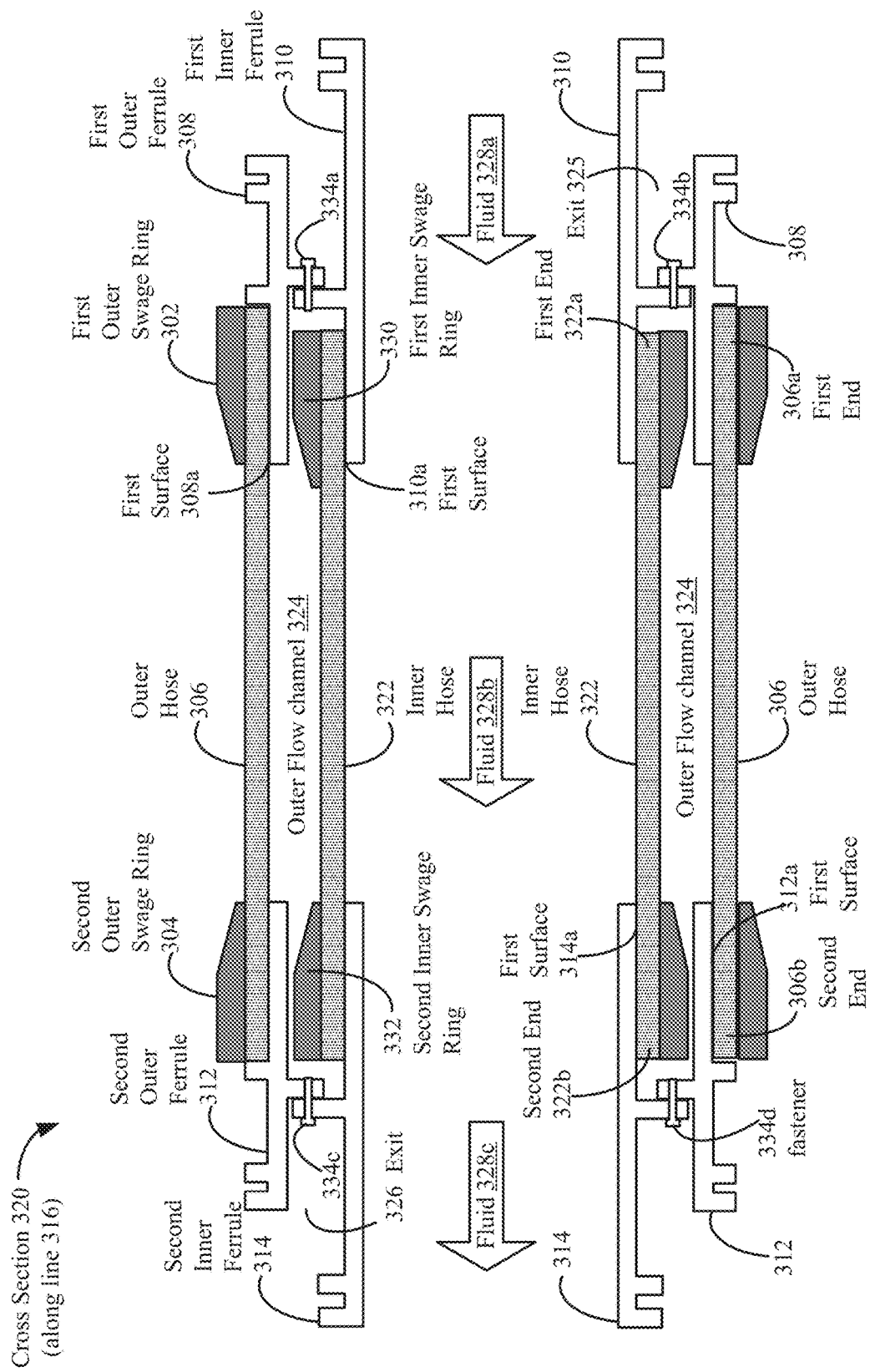

FIG. 7 is a first cross sectional view of the flexible doubled wall hose connection of FIG. 6, according to aspects of the present disclosure.

Figure 8:
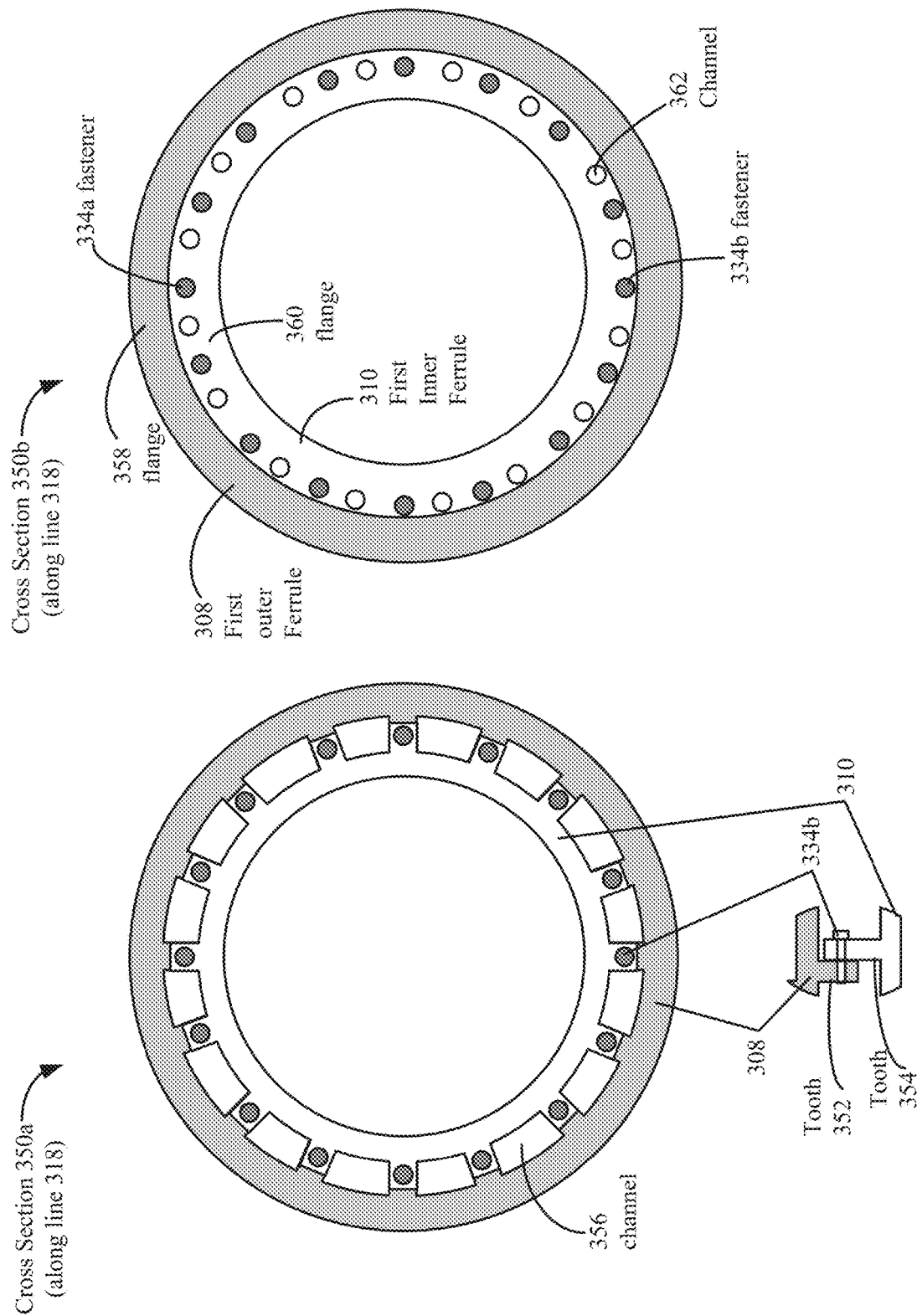

FIGS. 8A and 8B are second cross sectional views of the flexible doubled wall hose connection of FIG. 6, according to one aspect of the present disclosure.

Figure 9:
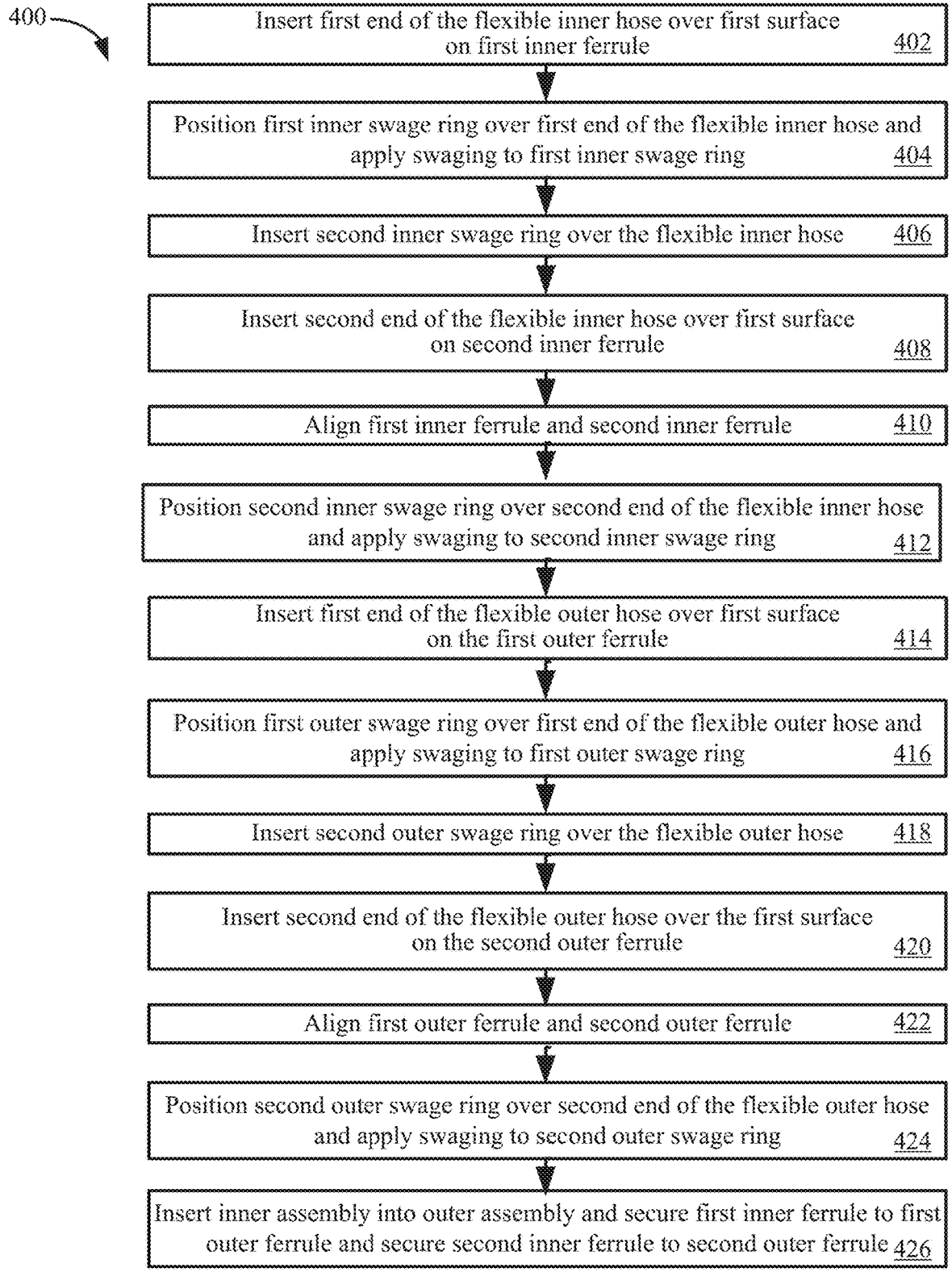

FIG. 9 is a block diagram of a method of assembling a doubled wall hose connection of FIG. 6 according to one aspect of the present disclosure.

Figure 10:
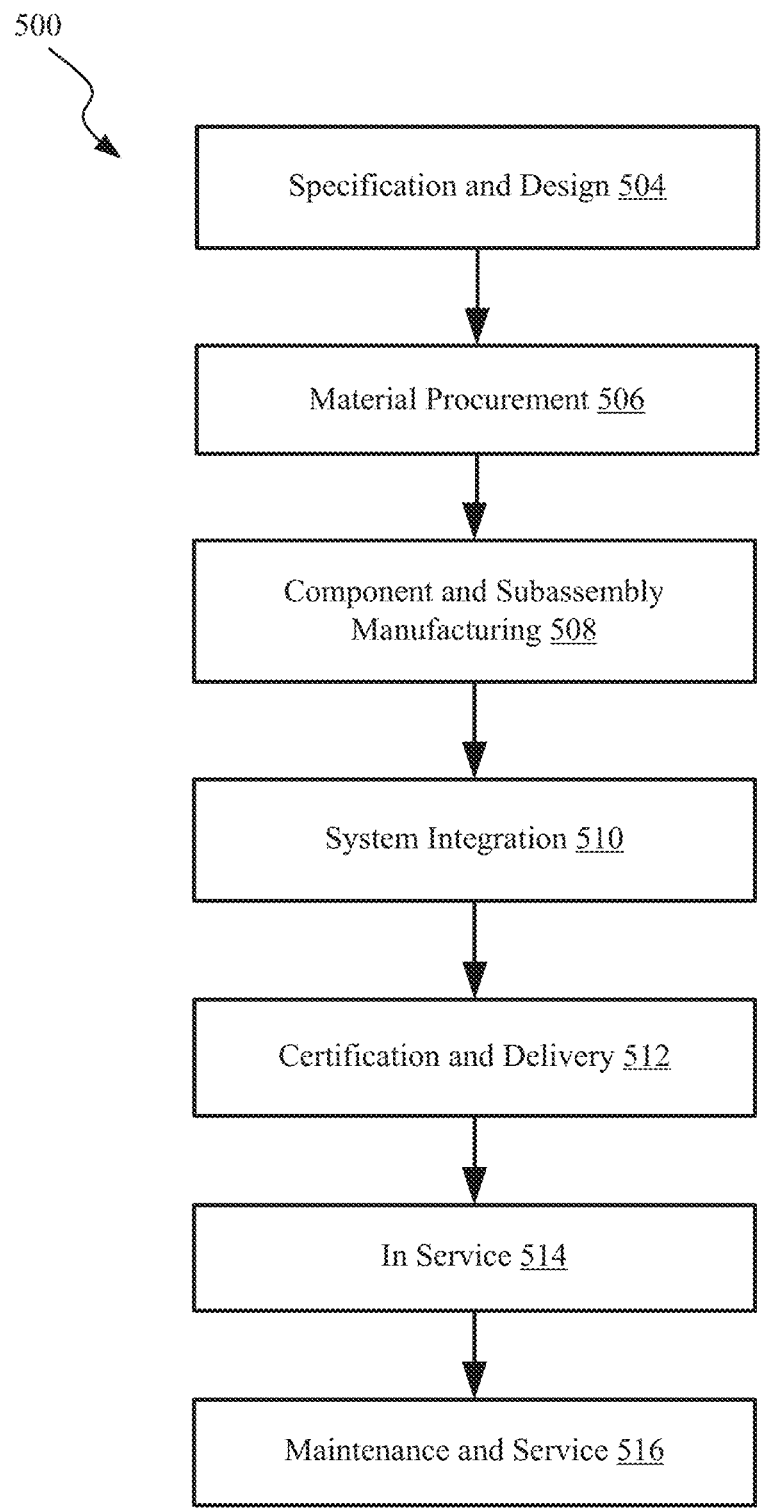

FIG. 10 is a block diagram of an aircraft production and service methodology that can utilize the fluid conduits described herein, according to one aspect of the present disclosure.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

A flexible conduit for transporting fluids in a fluid system, such a fluid system on an aircraft, and methods of assembling the flexible conduit described. The flexible conduit can include a flexible inner hose for transporting a fluid. The flexible inner hose can be surrounded by a flexible outer wall to form a flexible doubled wall hose connection. The flexible outer wall can be configured to contain any leakage of fluid from the flexible inner hose. The flexible inner hose and the flexible outer wall can be coupled on each end to ferrules. Swage rings can be swaged to secure the flexible inner hose and the flexible outer wall to the ferrules.

In more detail, with respect to FIG. 1, a jet aircraft and fuel tank locations are discussed. The fuel tanks can be part of a fluid system which utilizes the flexible fluid conduits described herein, such as the flexible doubled wall hose connection. With respect to FIG. 2, a flexible doubled wall hose connection is described. With respect to FIGS. 3 and 4A, a first and a second cross sectional view of the flexible doubled wall hose connection of FIG. 2 are described. With respect to FIG. 4B, a cross section of a ferrule is described. With respect to FIGS. 5A and 5B, a method of assembling a doubled wall hose connection of FIG. 2 is discussed.

With respect to FIG. 6, a second design of a flexible doubled wall hose connection is discussed. With respect to FIGS. 7, 8A and 8B, first, second and third cross sectional views of the flexible double wall hose connection of FIG. 6 are described. With respect to FIG. 9, a method of assembling a doubled wall hose connection of FIG. 6 is discussed. Finally, with respect to FIG. 10, an aircraft production and service methodology that can utilize the fluid conduits described herein is described.

Aircraft

FIG. 1A is a perspective view illustrating an airplane 2 and its associated aerodynamic high-lift device surfaces. On the wings 25, slats 5 are used near the leading edge of each wing. Near the trailing edge, spoilers 4, inboard (IB) flap 6, flaperon 8 and outboard (OB) flap 10, and an aileron 12 are provided on each wing. The high-lift device surfaces, such as the inboard flap 6, can be configured to articulate in some manner, relative to the wings 25.

The empennage 27 is provided with a vertical stabilizer 13, rudder 16 and rudder tab 18. The horizontal stabilizer 14 is provided with an elevator 20. The rudder 16 and rudder tab 18 can be configured to move relative to the vertical stabilizer and the elevator can be configured to move relative to the horizontal stabilizer.

In various embodiments, the airplane 2 can have an in-flight refueling system. For example, the airplane 2 can be configured to receive fuel in flight from another airplane. In another example, the airplane 2 can be configured as a tanker to deliver fuel to another airplane in-flight, such as the jet 30, described below with respect to FIG. 1B.

The airplane 2 can include a fluid system used to store and transport fuel as part of the in-flight refueling system. The fluid system can include a plurality of tanks for storing the fuel and a plurality of conduits for transporting the fluid to the tanks and between tanks. The plurality of conduits for transporting the fluid can travel among pressurized and non-pressurized zones on the airplane 2. The pressurized zones can have a high oxygen concentration. In the non-pressurized zones, the oxygen concentration can be much lower.

In the pressurized zones, because of the high oxygen concentrations, fuel leaks in fuel lines can pose a very serious fire hazard. Thus, it may be desirable to provide fluid conduits with extra safety precautions, such as double walls for containing fuel leaks. Examples of fluid conduits with double walls, which can provide an extra layer of safety for fuel containment, are described below with respect to FIGS. 2-9.

FIG. 1B is a top view illustrating a jet 30 (F-15E) and fuel tank locations. In one embodiment, the jet can be configured have an in-flight refueling system. For example, the jet 30 can be configured to receive fuel from airplane 2 in FIG. 1A when the airplane 2 is configured as a tanker.

The jet 30 includes a cockpit 36, a left wing 32, a right wing 34 and one or more fluid systems for transporting a fluid. The fluid can be in a liquid or a gas state. As examples, a fluid system can be used to store and transport fuel on the jet. As another example, a fluid system can be used to transport hydraulic fluid on the jet. In yet another example, the fluid system can be used to store and transport oxygen on the jet used by the pilot.

The fluid system used to store and transport the fuel is shown in more detail. The fluid system can include a plurality of tanks for storing the fuel and a plurality of conduits for transporting the fluid to the tanks and between tanks. For example, a main tank 38, a left wing tank 40, a right wing tank 42, a right engine feed tank 44, a left engine feed tank 46 and auxiliary tank 48, which store the fuel, are shown.

The jet 30 includes an in-flight refueling port 45, which can open in flight to allow for in-flight refueling. The in-flight refueling port 45 is coupled to a conduit, which is the refueling pipe 47. The refueling pipe transports fuel to the main tank 38. Other conduits (not shown) in the fluid system can transport fuel between the tanks, such as between main tank 38 and the left wing tank 40 or the right wing tank 42. As another example, conduits can transport fuel from the main tank 38 to the right engine feed tank 44 or the left engine feed tank.

In some instances, a conduit in the fluid system can be formed from a rigid material. In other instances, it may be desirable to utilize a flexible conduit to link different portions of the fluid system. For example, a flexible conduit may be desirable to utilize in a fluid system in areas that experience high structural vibration or in areas where structural interfaces occur, such as between the wing and the body of the jet. In general, the flexible conduit can be useful for load dissipation and for simplifying the installation of the fluid system.

Embodiments of flexible conduits that can be utilized in a fluid system are described below in the following section with respect to FIGS. 2-9. The flexible conduits can be utilized in a fluid system on an aircraft, such as the airplane or the jet, described above with respect to FIGS. 1A and 1B. In addition, the flexible conduits can be utilized in ground based fluid systems, such as but not limited to ground based fueling systems.

Flexible Double Walled Hose Connection

Next, with respect to FIGS. 2-9, flexible conduits which can be utilized in a fluid system are described. The flexible conduits can be formed by swaging flexible hoses to ferrules. In particular embodiments, the flexible conduits can be doubled walled to form flexible double walled hose connections. In more detail, with respect to FIGS. 2-5B, first embodiments of a flexible double walled hose connection and methods of assembling the first embodiments are described. With respect to FIGS. 6-8B, second embodiments of a flexible double walled hose connection and methods of assembling the second embodiments are described.

FIG. 2 is a top view of a flexible doubled wall hose (FDWH) connection 50, which is a first conduit that can be used in a fluid system. The FDWH connection 50 includes a first ferrule 52 and a second ferrule 54. A flexible outer wall is formed between the first ferrule and the second ferrule. A first end of the flexible outer wall can be secured to the first ferrule 52 using the first outer swage ring 58a and the second end of the flexible outer wall can be secured to the second ferrule 54 via the fourth outer swage ring 58d.

As shown in FIG. 2, the FDWH component 50 can use swage rings, such as 58a, 58b, 58c and 58d, to secure components. Swaging is a forging process in which the dimensions of an item can be altered using dies into which the item is forced. Swaging can be a cold or hot working process. Rotary swaging involves using two or more dies to hammer a round component, such as the swage rings, into a smaller diameter.

The sloped lines on the swage rings, such as line 55 on the first outer swage ring 58a, can represent the reduction in diameter of the swage ring due to swaging. The linear shape is shown for the purposes of illustration only. In general, after swaging, the outer diameter of the swage rings can be decreased in some areas and increased in other areas, where the increases and decreases of the outer diameter don't follow a linear profile.

In a particular embodiment, the flexible outer wall can be formed using a first flexible outer hose 60, a second flexible outer hose 61 and a support sleeve 62. A first end of the flexible outer hose 60, which forms the first end of the flexible outer wall, can be swaged to the first ferrule using the first outer swage ring 58a. A second end of the first flexible outer hose 60 can be swaged to the support sleeve 62 using the second outer swage ring 58b. In particular embodiments, the support sleeve 62 can be formed from a rigid material, such as a metal (e.g., aluminum or steel).

A first end of the second flexible outer hose 61 can be swaged to the support sleeve 62 using the third outer swage ring 58c. A second end of the second flexible outer hose 61, which forms the second end of the flexible outer wall, can be swaged to the second ferrule 54. The fourth outer swage ring 58d can be swaged to secure the second end of the second flexible hose 61 to the second ferrule.

The notches 64 for limit rings on the support sleeve 62 can be used when the second outer swage ring 58b and the third outer swage ring are swaged. The notches 64 can receive limit rings (e.g., see 112a and 112b in FIG. 3). The limit ring adjacent to the second outer swage ring 58b can prevent the second outer swage ring 58b from moving to the left over the support sleeve 62 when it is swaged. The limit ring adjacent to the third outer swage ring 58c can prevent the third outer swage ring 58c from moving to the left over the support sleeve 62 when it is swaged.

In particular embodiments, the first ferrule 52 and/or the second ferrule 54 can include a flange. For example, the second ferrule 54 includes a flange 56. The flange 56 can be used to secure the FDWH connection 50 to another conduit in the fluid system. For example, the flange 56 can include a plurality of apertures which allow fasteners to be inserted to secure the flange 56 to another conduit, such as a conduit with a complementary flange and apertures.

As described above, the FDWH connection 50 is double walled. To illustrate an internal structure of the FDWH connection 50, cross sections along lines 65 and 67 are described as follows with respect to FIGS. 3 and 4. In particular, FIG. 3 shows an internal structure of the ferrules and the internal hoses. Whereas, FIG. 4A shows an internal structure of the first ferrule 52.

FIG. 3 is a first cross sectional view 100 along line 65 of the FDWH connection 50 of FIG. 2. The first ferrule 52 (see FIG. 2) can include an outer portion 52a and inner portion 52b. In particular embodiments, the outer portion 52a and the inner portion 52b can be integrally formed. In another embodiment, the outer portion 52a and the inner portion 52b can be separately formed and fastened together (e.g., see FIGS. 7, 8A). The first ferrule 52 can be formed from a metal, such as steel or aluminum.

Similarly, the second ferrule 54 (see FIG. 2) can have an outer portion 54a and inner portion 54b. In particular embodiments, the outer portion 54a and the inner portion 54b can be integrally formed. In another embodiment, the outer portion 54a and the inner portion 54b can be separately formed and fastened together. The second ferrule 54 can be formed from a metal, such as steel or aluminum.

A plurality of swage rings are shown in the FIG. 3. The plurality of swage rings include a first inner swage ring 102a, a second inner swage ring 102b, a first outer swage ring 58a, a second outer swage ring 58b, a third outer swage ring 58c and a fourth outer swage ring 58d. In FIG. 3, the plurality of swage rings are shown after swaging has been applied as indicated by the sloped outer diameter. As described above, the sloped shape is for the purposes of illustration only and is not meant to be limiting.

Prior to swaging, the shape of the swage rings, such as the outer diameter, can be different than after swaging. For example, the outer diameter of the swage rings can be a constant diameter prior to swaging. After swaging, the outer diameter of the swage rings can be reduced in some areas and increased in other areas. In addition, the inner diameter of the swage rings can be reduced after swaging. The reduction in the inner diameters in the swage rings can secure 1) the flexible inner hose 110 to the first ferrule 52 and the second ferrule 54, 2) the first flexible outer hose 60 to the first ferrule 52 and the support sleeve 62 and 3) the second flexible outer hose 61 to the second ferrule 54 and the support sleeve 62. The swage rings can be formed from a metal, such as steel or aluminum.

The inner portion 52b of the first ferrule 52 can have a first surface 52c configured to receive a first end 110a of a flexible inner hose 110. Prior to swaging, a first inner swage ring 102a can be positioned over the first surface 52c and the first end 110a of the flexible inner hose 110 such that the first end 110a of the flexible inner hose 110 is disposed between the first inner swage ring 102a and the first surface 52c. Then, the first inner swage ring 102a can be swaged to secure the first end 110a of the flexible inner hose 110 to the inner portion 52b of the first ferrule 52.

The inner portion 54b of the second ferrule 54 can have a first surface 54c configured to receive a second end 110b of a flexible inner hose 110. Prior to swaging, a second inner swage ring 102b can be positioned over the first surface 54c and the second end 110b of the flexible inner hose 110 such that the second end 110b of the flexible inner hose 110 is disposed between the second inner swage ring 102b and the first surface 54c. Then, the second inner swage ring 102b can be swaged to secure the second end 110b of the flexible inner hose 110 to the inner portion 54b of the second ferrule 54.

As described above with respect to FIG. 2, the first flexible outer hose 60, the support sleeve 62, the second flexible outer hose 61 can form a flexible outer wall. In this example, the support sleeve 62 can be rigid. Thus, the flexible outer wall can include flexible portions and rigid portions. In another embodiment, the flexible outer wall can be formed entirely from a flexible material, such as a continuous flexible outer hose (e.g., see FIG. 6).

The outer portion 52a of the first ferrule 52 can have a second surface 52d configured to receive a first end 60a of the first flexible outer hose 60. Prior to swaging, the first outer swage ring 58a can be positioned over the second surface 52d and the first end 60a of the first flexible outer hose 60 such that the first end 60a of the first flexible outer hose 60 is disposed between the first outer swage ring 58a and the second surface 52d. Then, the first outer swage ring 58a can be swaged to secure the first end 60a of the first flexible outer hose 60 to the outer portion 52a of the first ferrule 52.

A second end 60b of the first flexible outer hose 60 can be inserted over the support sleeve 62 in the region to the right of the first limit ring 112a. Prior to swaging, the second outer swage ring 58b can be positioned over the second end 60b of the first flexible outer hose 60 and the support sleeve 62 such that the second end 60b of the first flexible outer hose 60 is disposed between the second outer swage ring 58b and the support sleeve 62. Then, the second outer swage ring 58b can be swaged to secure the second end 60b of the first flexible outer hose 60 to the support sleeve 62.

A first end 61a of the second flexible outer hose 61 can be inserted over the support sleeve 62 in the region to the left of the second limit ring 112b. Prior to swaging, the third outer swage ring 58c can be positioned over the first end 61a of the second flexible outer hose 61 and the support sleeve 62 such that the first end 61a of the second flexible outer hose 61 is disposed between the third outer swage ring 58c and the support sleeve 62. Then, the third outer swage ring 58c can be swaged to secure the first end 61a of the second flexible outer hose 61 to the support sleeve 62.

The outer portion 54a of the second ferrule 54 can have a second surface 54d configured to receive a second end 61b of the second flexible outer hose 61. Prior to swaging, the fourth outer swage ring 58d can be positioned over the second surface 54d and the second end 61b of the second flexible outer hose 61 such that the second end 61b of the second flexible outer hose 61 is disposed between the fourth outer swage ring 58d and the second surface 54d. Then, the fourth outer swage ring 58d can be swaged to secure the second end 61b of the second flexible outer hose 61 to the outer portion 54a of the second ferrule 54.

In particular embodiments, prior to swaging, a bonding agent or a sealing agent can be applied between 1) an inner surface of a flexible hose and an adjacent surface, 2) between an inner surface of a swage ring and an outer surface of the flexible hose or 3) combinations thereof. For example, prior to swaging, a bonding agent or a sealing agent can be applied between an inner surface of the flexible inner hose 110 and the first surface 52c on the inner portion 52b of the first ferrule. In another example, prior to swaging, a bonding agent or a sealing agent can be applied between an inner surface of the first flexible outer hose 60 and the second surface 52d on the outer portion 52a of the first ferrule 52. In yet another example, prior to swaging, a bonding agent or a sealing agent can be applied between an outer surface of the flexible inner hose 110 and an inner surface of the first inner swage ring 102a. In a further example, prior to swaging, a bonding agent or a sealing agent can be applied between an outer surface of the first flexible outer hose 60 and an inner surface of the first outer swage ring 58a.

After assembling, fluid 115a, fluid 115b and fluid 115c can be transported through an interior of the inner portion 52b of the first ferrule 52, an interior of the flexible inner hose 110 and an interior of the inner portion 54b of the second ferrule 54, respectively. The flexible outer wall including the first flexible outer hose 60, the support sleeve 62 and the second flexible outer hose 61 can surround the flexible inner hose 110. The flexible outer wall and the flexible inner hose 110 can be offset by a spacing amount in some areas to form fluid reservoirs, such as 106a and 106b. Further, a gap can be provided between the support sleeve 62 and the flexible inner hose 110 to form flow the outer flow channel 105. Thus, fluid can be transported between the fluid reservoirs 106a and 106b.

A fluid reservoir, such as 106a and 106b, can accumulate fluid when the flexible inner hose 110 is transporting fluid and a nearby breakage of the flexible inner hose 110 occurs. The fluid reservoirs can be in fluid communication with flow channels in the ferrules. The flow channels can receive fluid which accumulates in the fluid reservoirs, such as 106a and 106b, and transport the fluid through the ferrules, such as between the inner portion and the outer portion of the ferrule.

For example, the first ferrule 52 can include a plurality of flow channels, such as 122a and 122b, between the outer portion 52a and the inner portion 52b, which are in fluid communication with fluid reservoir 106a. An example of the plurality of flow channels 122 is shown in FIG. 4A, which is a second cross sectional view 120 of the FDWH connection 50 of FIG. 2 along line 67. The plurality of flow channels 122 can be disposed between the outer portion 52a and the inner portion 52b of the first ferrule 52. The number and arrangement of the flow channels 122 is provided for the purposes of illustration only and is not meant to be limiting.

Returning to FIG. 3, fluid which has accumulated in fluid reservoir 106a can flow through one or more of the flow channels 122, such as 122a and 122b, and through the exit 104a, which can be a ring, between the inner portion 52b and the outer portion 52a. In one embodiment, exit 104a can be sealed or covered in some manner, such as with a transparent material. The transparent material can allow fluid which has accumulated near the exit 104a to be viewed while still containing the fluid. Thus, a breakage in the flexible inner hose 110 can be detected while still maintaining fluid containment.

In one embodiment, a sensor can be provided near the exit 104a which can be used to convey an indication that the fluid has traveled through the first ferrule 52. For example, a sensor can be provided which changes color when it comes into contact with the fluid, such as 115a that is transported through the FDWH connection 50. The sensor can be disposed near exit 104a. A change in color of the sensor can be used to indicate that a breakage in the flexible inner hose 110 has occurred.

Similar to the first ferrule 52, the second ferrule 54 can include flow channels, such as 124a and 124b, which are in fluid communication with the fluid reservoir 106b. The flow channels can be disposed between the inner portion 54b and the outer portion 54a of the second ferrule 54. Fluid can accumulate in fluid reservoir 106b, travel through one of the flow channels and exit through exit 104b. Further, fluid can travel between the fluid reservoir 106a and the fluid reservoir 106b via the outer flow channel 105.

In another embodiment, the FDWH connection 50 can be used to transport to different fluids simultaneously in a fluid system. For example, as described above, a first fluid can be transported can be transported through an interior of the inner portion 52b of the first ferrule 52, an interior of the flexible inner hose 110 and an interior of the inner portion 54b of the second ferrule 54. A second fluid can be transported between the outer portion 52a and inner portion 52b of the first ferrule 52, through fluid reservoir 106a, through the outer flow channel 105 between the support sleeve 62, through the fluid reservoir 106b, and through the flexible inner hose 110 and between the outer portion 54a and the inner portion 54b of the second ferrule 54. The first fluid and the second fluid can be transported in a same or a different direction from one another.

As shown in FIG. 4A, a cross section of the first ferrule 52 can be circular. In particular embodiments, the flexible inner hose 110, the first flexible outer hose 60, the second flexible outer hose 61, the support sleeve 62, the second ferrule 54, first outer swage ring 58a, the second outer swage ring 58b, the third outer swage ring 58c, the fourth outer swage ring 58d, the first inner swage ring 102a and the second inner swage ring 102b can each have a circular cross section. In the case of the swage rings, the diameter can vary across its length. Whereas, the hoses and the support sleeve can have a constant diameter.

In particular, a diameter of the flexible outer wall, such as a diameter of the first flexible outer hose 60 or the second flexible outer hose 61, can be between one and ten inches. A length of a first conduit, such as the FDWH connection 50, can be between ten and thirty inches. However, larger or smaller diameters or larger or smaller lengths can be used and these examples are provided for the purposes of illustration only. These ranges can also be applied to second design of the FDWH connection 300 described below with respect to FIGS. 6-9.

In a particular embodiment, the material of the flexible hoses, such as the flexible inner hose 110, the first flexible outer hose 60 or the first flexible inner hose can be formed from a synthetic rubber. In another embodiment, a clamp between be disposed between the first limit ring 112a and the second limit ring 112b. The clamp can be used to secure the FDWH connection 50 to an adjacent structure, such as an internal structure of an aircraft.

FIG. 4B shows a cross section of the first ferrule 52 along line 65 in FIG. 2. The first ferrule 52 can include an inner portion 52b, an outer portion 52a and a plurality of fluid channels, such as 122a and 122b. The inner portion 52b can have a first surface 52c configured to receive a first end of a flexible inner hose and a first inner swage ring. As described above, the first inner swage ring can be swaged to couple the first end of the flexible inner hose to the first surface.

The outer portion 52a can have a second surface 52d configured to receive a first end of a flexible outer hose and a first outer swage ring. The flexible outer hose can surround a portion of the flexible inner hose. The first outer swage ring can be swaged to couple the first end of the flexible outer hose to the second surface. The plurality of fluid channels, such as 122a and 122b, can be configured to allow fluid to travel between the inner portion 52b and the outer portion 52a.

Next, a method 200 of assembling a FDWH connection 50 of FIG. 2-4 is described with respect to FIGS. 5A and 5B. In 202, the first end of the flexible inner hose can be inserted over the first surface on the inner portion of the first ferrule. In 204, the first inner swage ring can be positioned over the first end of the flexible inner hose such that the first end is disposed between the first inner swage ring and the first surface. Then, the first inner swage ring can be swaged to secure the first end of the flexible inner hose to the first ferrule.

In 206, the first end of the first flexible outer hose can be inserted over the second surface on an outer portion of the first ferrule. In 208, the first outer swage ring can be positioned over the first end of the first flexible outer hose such that the first end is disposed between the first outer swage ring and the second surface. Then, the first outer swage ring can be swaged to secure the first end of the first flexible outer hose to the first ferrule.

In 210, the support sleeve can be inserted over the flexible inner hose and beneath the second end of first flexible outer hose. In 212, the second outer swage ring can be positioned over the second end of the first flexible outer hose such that the second end is disposed between the second outer swage ring and the support sleeve. Then, the second outer swage ring can be swaged to secure the second end of the first flexible outer hose to the support sleeve.

In 214, the second flexible outer hose can be inserted over the flexible inner hose and the first end of second flexible outer hose can be inserted over the support sleeve. In 216, the third outer swage ring can be inserted over the flexible inner hose and the second flexible outer hose. In 218, the second inner swage ring can be inserted over the flexible inner hose. In 220, the fourth outer swage ring can be inserted over the flexible inner hose and the second flexible outer hose.

In 222, the second end of the flexible inner hose can be inserted over the first surface on the inner portion of the second ferrule. In 224, the third outer swage ring, the fourth outer swage ring and the second flexible outer hose can be slid to the right over the support sleeve to generate space to swage the second inner swage ring. In 226, the second inner swage ring can be positioned over the second end of the flexible inner hose such that the second end of the flexible inner hose is disposed between the second inner swage ring and the first surface on the inner portion of the second ferrule. Then, the second inner swage ring can be swaged to secure the second end of the flexible inner hose to the second ferrule.

In 228, the second end of the second flexible outer hose can be slid over the second surface on the outer portion of second ferrule. In 230, the third outer swage ring can be positioned over the first end of the second flexible outer hose such that the first end is disposed between the third outer swage ring and the support sleeve. Then, the third outer swage ring can be swaged to secure the first end of the second flexible outer hose to the support sleeve. In 232, the fourth outer swage ring can be positioned over the second end of the second flexible outer hose such that the second end is disposed between the fourth outer swage ring and the second surface on the outer portion of the second ferrule. Then, the fourth outer swage ring can be swaged to secure the second end of the second flexible outer hose to the second ferrule.

Next, with respect to FIGS. 6-9, second designs of a flexible double walled hose connection and methods of assembling the designs are described. FIG. 6 is a top view of a FDWH connection 300, which is a second conduit that can be used in a fluid system. The FDWH connection 300 includes a first outer ferrule 308, a first inner ferrule 310, a second outer ferrule 312 and a second inner ferrule 314.

A flexible outer wall can be formed between the first outer ferrule 308 and the second outer ferrule 312 using the flexible outer hose 306. A first end of the flexible outer hose 306 can be secured to the first outer ferrule 308 using the first outer swage ring 302 and a second end of the flexible outer wall can be secured to the second outer ferrule via the second outer swage ring 304. The first outer swage ring 302 and the second outer swage ring 304 are shown in a post-swaged shape.

As shown in FIG. 7, the first inner ferrule 310 can extend into an interior of the first outer ferrule 308. Further, the second inner ferrule 314 can extend into an interior of the second outer ferrule 312. The first inner ferrule 310 and the second inner ferrule 314 can be coupled to a flexible inner hose (not visible). To illustrate the interfaces between 1) the first inner ferrule 310, the second inner ferrule 314 and the flexible inner hose 322, 2) the first outer ferrule 308 and the first inner ferrule 310 and 3) the second outer ferrule 312 and the second inner ferrule 314, the FDWH connection 300 is rendered along cross section line 316 and cross section line 318 in FIGS. 7 and 8A, respectively. FIG. 8B shows an alternate rendering of FDWH connection 300 along cross section line 318.

FIG. 7 is a first cross sectional view 320 of the FDWH connection 300 of FIG. 6 along cross section line 316. As described above, the flexible inner hose 322 can be coupled to the first inner ferrule 310 and the second inner ferrule 314. The flexible inner hose 322 can be surrounded by the flexible outer hose 306.

The first inner ferrule 310 can have a first surface 310a configured to receive a first end 322a of the flexible inner hose 322. Prior to swaging, a first inner swage ring 330 can be positioned over the first surface 310a and the first end 322a of the flexible inner hose 322 such that the first end 322a of the flexible inner hose 322 is disposed between the first inner swage ring 330 and the first surface 310a. Then, the first inner swage ring 330 can be swaged to secure the first end 322a of the flexible inner hose 322 to the first inner ferrule 310.

The second inner ferrule 314 can have a first surface 314a configured to receive a second end 322b of the flexible inner hose 322. Prior to swaging, a second inner swage ring 332 can be positioned over the first surface 314a and the second end 322b of the flexible inner hose 322 such that the second end 322b of the flexible inner hose 322 is disposed between the second inner swage ring 332 and the first surface 314a on the second inner ferrule 314. Then, the second inner swage ring 332 can be swaged to secure the second end 322b of the flexible inner hose 322 to the second inner ferrule 314.

The first outer ferrule 308 can have a first surface 308a configured to receive a first end 306a of the flexible outer hose 306. Prior to swaging, a first outer swage ring 302 can be positioned over the first surface 308a and the first end 306a of the flexible outer hose 306 such that the first end 306a of the flexible outer hose 306 is disposed between the first outer swage ring 302 and the first surface 308a. Then, the first outer swage ring 302 can be swaged to secure the first end 306a of the flexible outer hose 306 to the first outer ferrule 308.

The second outer ferrule 312 can have a first surface 312a configured to receive a second end 306b of the flexible outer hose 306. Prior to swaging, a second outer swage ring 304 can be positioned over the first surface 312a and the second end 306b of the flexible outer hose 306 such that the second end 306b of the flexible outer hose 306 is disposed between the second outer swage ring 304 and the first surface 312a. Then, the second outer swage ring 304 can be swaged to secure the second end 306b of the flexible outer hose 306 to the second outer ferrule 312.

In one embodiment, the first inner ferrule 310, the flexible inner hose 322 and the second inner ferrule 314 can be coupled to one another, via the first inner swage ring 330 and the second inner swage ring 332, to form an inner assembly. The first outer ferrule 308, the flexible outer hose 306 and the second outer ferrule 312 can be coupled to one another, via the first outer swage ring 302 and the second outer swage ring 304, to form an outer assembly. Then, the inner assembly can be inserted into the outer assembly and secured together via fasteners, such as fasteners 334a, 334b, 334b and 334d, to form the FDWH connection 300. Additional details of the assembly and fastening process are described in more detail below with respect to FIGS. 8A, 8B and 9.

The inner assembly, including the first inner ferrule 310, the flexible inner hose 322 and the flexible second inner ferrule 314, can form an inner flow channel configured to transport a fluid, such as fluid 328a, fluid 328b and fluid 328c through the FDHW connection 300. The outer assembly, including the first outer ferrule 308, the flexible outer hose 306 and the second outer ferrule 312, surrounds the inner assembly. Between the inner assembly and the outer assembly, an outer flow channel 324 can be formed.

The outer flow channel 324 can capture fluid if any breakages occur in the flexible inner hose 322 while the flexible inner hose is transporting fluid. The inner ferrules and the outer ferrules can be configured to be secured together in a manner such that flow channels are formed between the inner and the outer ferrules. The flow channels can be fluidly coupled to the outer flow channel 324. The flow channels between the inner ferrules and outer ferrules can allow fluid which accumulates in the outer flow channel to be transported between the inner and outer ferrules and out an exit between the inner and outer ferrules, such as exit 325 and exit 326.

In some embodiment, the exits, such as exit 325 and 326, can be sealed. Thus, any fluid accumulated in the outer flow channel 324 and between the inner and outer ferrules can be contained. However, a window and/or sensors can be used at the sealed exits so that the presence of fluid near the exits can be detected and the presence of a leak in the flexible inner hose 322 can be ascertained.

Next, a few examples of the interface between the inner ferrules and the outer ferrules is described with respect to FIGS. 8A and 8B. In particular, cross sectional views, 350a and 350b, of the FDWH connection 300 of FIG. 6 along cross section line 318 are discussed. In FIGS. 8A and 8B, the first inner ferrule 310 and the first outer ferrule 308 have a circular cross section.

In FIG. 8A, the first outer ferrule 308 at cross section line 318 includes a first plurality of teeth, such as tooth 352. The first inner ferrule 310 at cross section line 318 includes a second plurality of teeth, such as tooth 354. The first plurality of teeth can each include a first aperture and the second plurality of teeth can each include a second aperture. The first plurality of teeth and the second plurality of teeth can be aligned such that the first apertures align with the second apertures. Then, a fastener can be inserted through each of the aligned first apertures and second apertures. For example, fastener 334b is inserted through the aligned first aperture and the second aperture in tooth 352 and tooth 354, respectively.

A plurality of flow channels, such as flow channel 356, can be formed between the teeth. As described above, the plurality of flow channels can be fluidly coupled to the outer flow channel 324. The plurality of flow channels can allow fluid which has accumulated in the outer flow channel 324 to travel between the inner ferrules and the outer ferrules.

In FIG. 8B, the first outer ferrule 308 at cross section line 318 includes a first flange 358 and the first inner ferrule 310 includes a second flange 360. The first flange 358 includes first plurality of apertures. The second flange 360 includes a second plurality of apertures. The number and size of the first plurality of apertures and the second plurality of apertures is provided for the purposes of illustration only and is not meant to be limiting.

When the first outer ferrule 308 is mechanically coupled to the first inner ferrule 310, the first plurality of apertures can be aligned with the second plurality of apertures. A first portion of the aligned first plurality and second plurality of apertures can be configured to receive fasteners, such as fastener 334a and fastener 334b. A second portion of the aligned first plurality and second plurality of apertures can be configured to provide flow channels, such as flow channel 362. The flow channels can allow fluid which has accumulated in the outer flow channel 324 to travel between the inner ferrules and the outer ferrules.

Next, a method 400 of assembling the FDWH connection 300 described with respect to FIGS. 6, 7, 8A and 8B is described with respect to FIG. 9. In 402, a first end of the flexible inner hose can be inserted a over first surface on the first inner ferrule. In 404, the first inner swage ring over can be positioned over a first end of the flexible inner hose such that the first end is disposed between the first inner swage ring and the first surface. Then, the first inner swage ring can be swaged to secure the first end of the flexible inner hose to the first surface.

In 406, a second inner swage ring can be inserted over the flexible inner hose. In 408, the second end of the flexible inner hose can be inserted over a first surface on the second inner ferrule. In 410, the first inner ferrule and the second inner ferrule can be aligned. In particular, the teeth extending from the first inner ferrule and the teeth extending from the second inner ferrule (see FIG. 8A) can be aligned. In another embodiment, first apertures in a first flange extending from the first inner ferrule and second apertures in a second flange extending from the second inner ferrule can be aligned (see FIG. 8B).

In 412, a second inner swage ring can be positioned over a second end of the flexible inner hose. After the second inner swage ring is positioned, the second end of the flexible inner hose can be disposed between the second inner swage ring and the first surface on the second inner ferrule. Then, the second inner swage ring can be swaged to secure the second of the flexible inner hose to the second inner ferrule.

In 414, the first end of the flexible outer hose can be inserted over the first surface on the first outer ferrule. In 416, the first outer swage ring can be positioned over the first end of the flexible outer hose such that the first end is disposed between the first outer swage ring and the first surface on the first outer ferrule. Then, the first outer swage ring can be swaged to secure the first end to the first outer ferrule.

In 418, the second outer swage ring can be inserted over the flexible outer hose. In 420, the second end of the flexible outer hose can be inserted over the first surface on the second outer ferrule. In 422, the first outer ferrule and second outer ferrule can be aligned. In particular, the teeth extending from the first outer ferrule and the teeth extending from the second outer ferrule (see FIG. 8A) can be aligned. In another embodiment, first apertures in a first flange extending from the first outer ferrule and second apertures in a second flange extending from the second outer ferrule can be aligned (see FIG. 8B).

In 424, the second outer swage ring can be positioned over the second end of the flexible outer hose such that the second end is disposed between the second outer swage ring and the first surface on the second outer ferrule. Then, the second outer swage ring can be swaged to secure the second end of the flexible outer hose to the second outer ferrule.

In 426, the inner assembly including the first inner ferrule, the second inner ferrule and the flexible inner hose can be inserted into the outer assembly including the first outer ferrule, the second outer ferrule and the flexible outer hose. In one embodiment, teeth including apertures, which extend from the first inner ferrule, the second inner ferrule, the first outer ferrule and the second outer ferrule, can be aligned. In another embodiment, apertures in flanges, which extend from the first inner ferrule, the second inner ferrule, the first outer ferrule and the second outer ferrule can be aligned. Fasteners can be inserted through the aligned apertures to secure the first inner ferrule to the first outer ferrule and to secure the second inner ferrule to the second outer ferrule.

Examples of Aircraft Application

An aircraft manufacturing and service method 500 shown in FIG. 10 is now described to better illustrate various features of processes and systems presented herein. During pre-production, aircraft manufacturing and service method 500 may include specification and design 504 of an aircraft and material procurement 506. The production phase involves component and subassembly manufacturing 508 and system integration 510 of the aircraft (e.g. see jet 10 in FIG. 1B). Some examples of aircraft on which the flexible fluid conduits described herein can be used include military aircraft and commercial aircraft. In particular, commercial aircraft (e.g., see airplane 2 in FIG. 1A) modified for military application that have inflight fueling capabilities, such as the presidential transport, C-17 transport, tankers, recon sensor aircrafts can utilize the flexible fluid conduits described herein.

System integration can also occur before material procurement 506. Aspects of the specification and design of a flexible fluid conduit, such as flexible doubled wall hose connection, which can be used with an aircraft, are described above with respect to FIGS. 2-9. Thereafter, the aircraft may go through certification and delivery 512 in order to be placed in service 514. While in service by a customer, the aircraft can be scheduled for routine maintenance and service 516 (which may also include modification, reconfiguration, refurbishment, and so on). While the embodiments described herein relate generally to servicing of commercial aircraft, they may be practiced at other stages of the aircraft manufacturing and service method 500.

Each of the processes of aircraft manufacturing and service method 500 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

CONCLUSION

Different examples and aspects of the apparatus and methods are disclosed herein that include a variety of components, features, and functionality. In particular, apparatus and methods associated with a flexible fluid conduit, such as a flexible double walled fluid conduit, which can be used on an aircraft, are discussed. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. A fluid system, configured to transport a fluid, the fluid system comprising:
    a rigid first outer ferrule, comprising:
        a first plurality of teeth, each of the first plurality of teeth including a first aperture; and
        a first flow channel, disposed between two of the first plurality of teeth;
    a rigid first inner ferrule, coupled to the first outer ferrule and comprising:
        a second plurality of teeth, each of the second plurality of teeth including a second aperture, wherein each of the first apertures is aligned with a corresponding second aperture; and
        a second flow channel, disposed between two of the second plurality of teeth, wherein the first flow channel is in fluid communication with the second flow channel;
    a plurality of fasteners, each of the plurality of fasteners inserted through one of the first apertures and the correspondingly aligned second aperture;
    a flexible inner hose, coupled to the first inner ferrule and configured to receive the fluid, wherein the first inner ferrule and the flexible inner hose forms an inner flow channel; and
    a flexible outer hose, surrounding the flexible inner hose and coupled to the first outer ferrule, wherein the first outer ferrule, the flexible outer hose, the first inner ferrule, and flexible inner hose forms an outer flow channel, and wherein the outer flow channel is in fluid communication with the first flow channel and the second flow channel.

2. The fluid system of claim 1, wherein the first inner ferrule comprises a first surface receiving a first end of the flexible inner hose, and wherein the fluid system further comprises:
    a first inner swage ring; the first inner swage ring swaging the first end to the first surface.

3. The fluid system of claim 1, wherein at least a portion of the first inner ferrule is disposed within a portion of the first outer ferrule.

4. The fluid system of claim 1, wherein the first outer ferrule comprises a first surface receiving a first end of the flexible outer hose, and wherein the fluid system further comprises:
    a first outer swage ring, the first outer swage ring swaging the first end to the first surface.

5. The fluid system of claim 1, wherein the outer flow channel is configured to capture fluid leaking from the inner flow channel.

6. The fluid system of claim 5, wherein the first flow channel and the second flow channel are configured to allow fluid to flow out from the outer flow channel through an exit.

7. The fluid system of claim 1, further comprising:
    a rigid second outer ferrule; and
    a rigid second inner ferrule.

8. The fluid system of claim 7, wherein the flexible outer hose comprises a first end coupled to the first outer ferrule and a second end coupled to the second outer ferrule.

9. The fluid system of claim 7, wherein the second outer ferrule is coupled to the second inner ferrule.

10. The fluid system of claim 9, wherein the second outer ferrule is coupled to the second inner ferrule via a plurality of fasteners.

11. The fluid system of claim 9, wherein the flexible inner hose and the flexible outer hose allows for the first outer ferrule and the first inner ferrule to move relative to the second outer ferrule and the second inner ferrule.

12. The fluid system of claim 9, wherein the flexible outer hose is swaged to the second outer ferrule, and wherein the flexible inner hose is swaged to the second inner ferrule.

13. A fluid system; comprising:
    an outer assembly comprising:
        a rigid first outer ferrule, comprising:
            a first plurality of teeth, each of the first plurality of teeth including a first aperture; and
            a first flow channel, disposed between two of the first plurality of teeth;
        a rigid second outer ferrule; and
        a flexible outer hose, swaged to the first outer ferrule, swaged to the second outer ferrule, and configured to surround a flexible inner hose.

14. The fluid system of claim 13, further comprising;
    an inner assembly comprising:
        a rigid first inner ferrule, comprising:
            a rigid second inner ferrule; and
            the flexible inner hose, coupled to the first inner ferrule and the second inner ferrule.

15. The fluid system of claim 14, wherein the first inner ferrule comprises:
    a second plurality of teeth, each of the second plurality of teeth including a second aperture.

16. The fluid system of claim 15, further comprising:
    a plurality of fasteners, each of the plurality of fasteners inserted through one of the first apertures and one of the second apertures.

17. The fluid system of claim 15, wherein the flexible inner hose is swaged to the first inner ferrule and is swaged to the second inner ferrule.

18. The fluid system of claim 15, wherein the first inner ferrule further comprises: a second aperture a second flow channel, disposed between two of the second plurality of teeth.

19. A method of assembling the fluid system of claim 13, the method comprising:
    inserting a first end of a flexible inner hose over a surface of a rigid first inner ferrule;
    swaging a first inner swage ring to secure the first end of the flexible inner hose to the surface of the first inner ferrule, wherein the first end of the flexible inner hose is disposed between the first inner swage ling and the surface of the first inner ferrule;

inserting a first end of the flexible outer hose over the flexible inner hose and over a surface of the rigid first outer ferrule; and swaging a first outer swage ring to secure the first end of the flexible outer hose to the surface of the first outer ferrule, wherein the first end of the flexible outer hose is disposed between the first outer swage ring and the surface of the first outer ferrule.

20. The method of claim 19, further comprising:

inserting a plurality of fasteners through apertures of a first plurality of teeth of the first outer ferrule and through apertures of a second plurality of teeth of the first inner ferrule.

* * * * *